T. C. LUCE.
VALVE ATTACHMENT.
APPLICATION FILED FEB. 8, 1917.

1,240,230.

Patented Sept. 18, 1917.

Inventor
Thomas C Luce
By his Attorney
Harry L Duncan

UNITED STATES PATENT OFFICE.

THOMAS C. LUCE, OF STRATFORD, CONNECTICUT, ASSIGNOR TO PRATT & CADY COMPANY, INCORPORATED, OF HARTFORD, CONNECTICUT, A CORPORATION OF NEW YORK.

VALVE ATTACHMENT.

1,240,230.  Specification of Letters Patent.  Patented Sept. 18, 1917.

Application filed February 8, 1917. Serial No. 147,340.

*To all whom it may concern:*

Be it known that I, THOMAS C. LUCE, a citizen of the United States, and resident of Stratford, county of Fairfield, State of Connecticut, have made a certain new and useful Invention Relating to Valve Attachments, of which the following is a specification, taken in connection with the accompanying drawing, which forms part of the same.

This invention relates especially to attachments for steam valves or the like by which an operating device, such as a sprocket wheel, may be secured to the valve stem. The hub of the wheel or operating device may be provided with a squared tapered hole with which an interchangeable and preferably sectional adjustable centering connecting member may coöperate having a stem aperture adapted to grip and hold the valve stem and preferably tapered oppositely to the outer surface of this connecting member. Securing means, such as bolts or screws, may removably secure the connecting member in position and in this way a number of these connecting members may also be interchangeably used so as to accommodate different sized or shaped stems.

Figure 1:
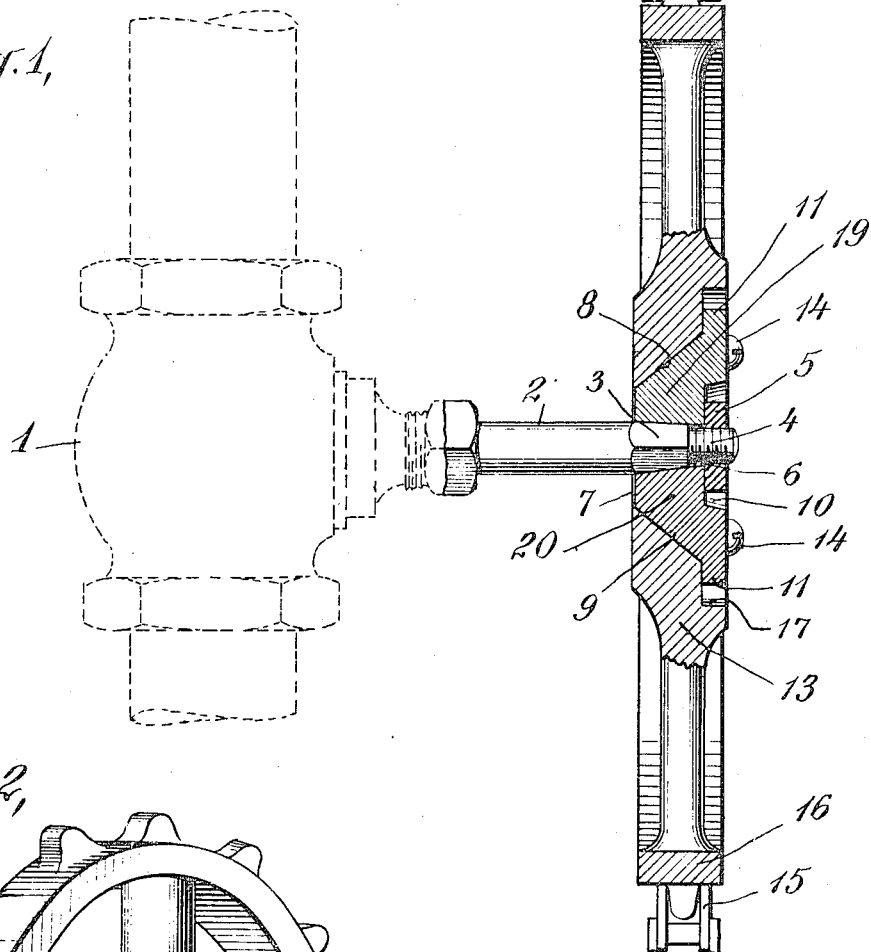

In the accompanying drawings showing in a somewhat diagrammatic way illustrative embodiments of this invention, Figure 1 is a vertical section.

Figure 2:
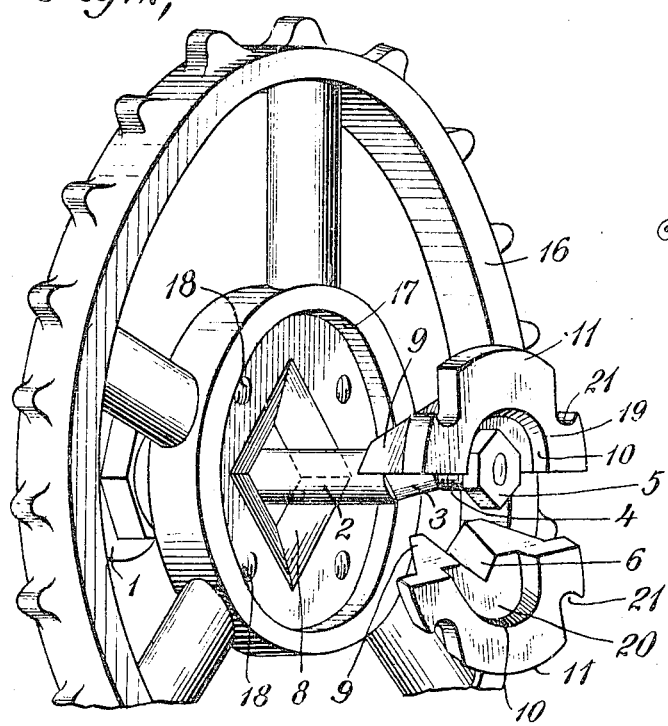
Figure 3:
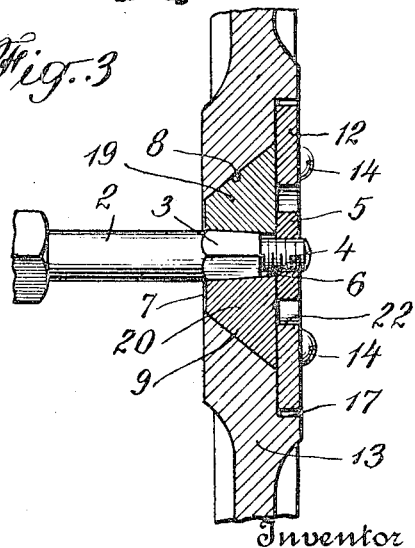

Fig. 2 is a perspective view showing the device with its parts separated for greater clearness; and Fig. 3 is a vertical section through a modified arrangement.

The steam or other valve 1 of any suitable construction may have its stem 2 provided with the usual non-circular or squared tapered end 3 from which the usual operating hand wheel may of course be removed as by unscrewing the fastening device or nut 5 from the threaded tip 4. This attachment allows an operating device, such, for instance, as the sprocket wheel 16 with which the sprocket chain 15 may coöperate to be readily and accurately secured to the valve stem and held in proper alinement therewith.

For this purpose the hub 13 of the operating wheel may be formed with a hole 8 which is preferably tapered and given a square or other non-circular cross-section, and if desired an annular recess 17 may be formed in one side of the hub so as to coöperate with the larger end of this hole. A suitable connecting member preferably of interchangeable sectional character is arranged to be clamped in this hole and secured to the valve stem and for some purposes it is desirable to have this centering member or bushing composed of two or more parts, such as 19, 20, which may have the squared wedging faces 9 adapted to coöperate with the square tapered hole 8 in the wheel. This sectional connecting member may be formed with a centrally located non-circular or square and preferably oppositely tapered stem aperture 6 of such shape as to fit around the stem of the particular valve to which the attachment is to be applied and be securely held thereon as by tightening the fastening nut 5 which may be given a final tightening after the other parts are assembled. As indicated in Fig. 2 the parts of the sectional connecting member or bushing may be arranged around the stem and then fitted into the tapered hole 8 in the wheel hub where they may be secured in position by any suitable means, as for instance, by forcing them inward by the securing screws or nuts 14 which may pass through the slots 21 in the connecting member so as to be screwed into the threaded holes 18 in the hub. This serves to simultaneously force the parts of this connecting member inward around the stem and to insure the alinement or centering of these parts of the stem with respect to the operating wheel so that a secure and accurate connection is formed in this way. By varying the extent to which this sectional bushing 19, 20 is forced inward the size of the resulting central aperture therein is correspondingly varied so as to accommodate larger sized squared stem ends, for example.

As illustrated in Fig. 3, the bushing sections 19, 20 may in some cases be advantageously used without the flange and in this case it is sometimes desirable to use a suitable securing washer 12 to engage the bushing sections and force them into the aperture in the wheel. This washer 12 may, as indicated, be held in place by suitable securing screws 14 and may as indicated fit within the recess 17. It is desirable in this case to form a central recess, such as 22, in this washer, so that access can be readily secured to the nut 5. In this way as in the case of the Fig. 1 construction, the wheel attachment has a neat appearance closely resembling an ordinary operating wheel, and in this case also a considerable range of adjustment is secured so that the sectional bushing may coöperate with stems of somewhat different size.

It is of course understood that different connecting members provided with stem apertures of such size and shape as to properly coöperate with different valve stems may be furnished with the wheel and other parts of the attachment so that by selecting the proper one of these connecting members which have relatively lower cost the wheel and attachment may be fitted and secured to practically any ordinary size or style of valve stem.

This invention has been described in connection with a number of illustrative embodiments, forms, arrangements, materials, numbers of parts, and methods of assembly, and use, to the details of which disclosure the invention is not of course to be limited, since what is claimed as new and what is desired to be secured by Letters Patent is set forth in the appended claims.

1. In operating attachments for steam valves or the like, a sprocket operating wheel having a hub formed with a square tapered hole and with an annular recess communicating with the larger end of said hole, interchangeable sectional centering clamping bushings having a square tapered stem aperture and oppositely tapered squared wedging faces to coöperate with said hole in said hub to center said stem aperture with respect to said wheel and having a securing flange to fit within said recess and a central depression inside said flange to accommodate the fastening device of the valve stem and securing screws to adjustably hold said connecting member in said hub and allowing access to the end of the wheel stem and the fastening device thereof.

2. In operating attachments for steam valves or the like, a sprocket operating wheel having a hub formed with a square tapered hole, interchangeable sectional centering clamping bushings having a non-circular tapered stem aperture and oppositely tapered squared wedging faces to coöperate with said hole in said hub to center said stem aperture with respect to said wheel and securing means to hold said connecting member in said hub and allowing access to the end of the wheel stem and the fastening device thereof.

3. In operating attachments for steam valves or the like, an operating wheel having a hub formed with a square tapered hole, an interchangeable sectional centering clamping connecting member having a square tapered stem aperture and oppositely tapered squared wedging faces to coöperate with said hole in said hub to center said stem aperture with respect to said wheel and securing screws to hold said connecting member in said hub and allowing access to the end of the wheel stem and the fastening device thereof.

4. In operating attachments for steam valves or the like, an operating wheel formed with a square tapered hole, an interchangeable sectional centering clamping connecting member having a non-circular stem aperture and squared wedging faces to coöperate with said hole to center said stem aperture with respect to said wheel and securing means to hold said connecting member in said wheel.

5. In operating attachments for steam valves or the like, an operating wheel formed with a tapered hole, an interchangeable centering connecting member having a non-circular stem aperture and said connecting member being formed to render adjustable the size of said stem aperture, wedging faces to coöperate with said hole to center said stem aperture with respect to said wheel and securing means to hold said connecting member in said wheel.

6. In operating attachments for steam valves or the like, an operating wheel formed with a tapered hole, an interchangeable sectional centering clamping connecting member having a stem aperture and wedging faces to coöperate with said hole to center said stem aperture with respect to said wheel and securing means to hold said connecting member in said wheel.

7. In operating attachments for steam valves or the like, an operating wheel formed with a hole, an interchangeable sectional centering connecting member having a stem aperture to coöperate with said hole to center said stem aperture with respect to said wheel and securing means to hold said connecting member in said wheel.

THOMAS C. LUCE.

Witnesses:
WALTER F. FITZGERALD,
WILLIAM B. SIEGLER.